United States Patent [19]

Talmadge

[11] Patent Number: 4,980,785
[45] Date of Patent: Dec. 25, 1990

[54] DISK DRIVE SLOT DUST PROTECTOR

[75] Inventor: Hal Talmadge, Scottsdale, Ariz.

[73] Assignees: James Taylor, Tempe; Mitch Frazier, Chandler, both of Ariz. ; a part interest

[21] Appl. No.: 335,845

[22] Filed: Apr. 10, 1989

[51] Int. Cl.$^5$ .................... G11B 23/02; G11B 1/00; F41H 3/00
[52] U.S. Cl. .................... 360/97.02; 360/137; 70/158; 369/12; 312/10
[58] Field of Search .................... 360/97.01, 97.02, 137; 70/14, 158; 369/12; 312/1, 10; 455/347, 348

[56] References Cited

U.S. PATENT DOCUMENTS

| | | | |
|---|---|---|---|
| 4,112,471 | 9/1978 | Pollard et al. | 360/97.02 |
| 4,124,872 | 11/1978 | Propst | 360/72 |
| 4,174,039 | 11/1979 | Frankhuizen | 206/444 |
| 4,365,280 | 12/1982 | Crosetti et al. | 360/137 X |
| 4,400,750 | 8/1983 | Krane | 360/105 |
| 4,481,552 | 11/1984 | Dona et al. | 360/97.02 |
| 4,533,966 | 8/1985 | Kume | 360/137 |
| 4,630,160 | 12/1986 | Murayama | 360/137 X |
| 4,685,312 | 8/1987 | Lakoski et al. | 70/14 |

FOREIGN PATENT DOCUMENTS 58-194103  11/1983  Japan .................... 360/137

OTHER PUBLICATIONS

IBM Tech. Discl. Bulletin, vol. 30, No. 8, Jan. 88, pp. 178-179, "Security Device for Disk Drive" (no author).
IBM Tech Discl. Bulletin, vol. 28, No. 7, Dec. 85, pp. 2785-2798, Industrial Personal Computer for Class "C" Industrial Environment (no author).

Primary Examiner—David J. Severin
Assistant Examiner—Alfonso Garcia
Attorney, Agent, or Firm—LaValle D. Ptak

[57] ABSTRACT

A computer disk drive dust protector is made in the form of an elongated wedge-shaped slot entry member which is inwardly tapered at the edges, so that insertion of the member into the disk drive slot causes the member to tightly wedge within the slot from end to end and from top to bottom, thereby preventing the entry of dust into the slot. A handle is attached to the rear edge of the slot entry member to facilitate the insertion of the member into the computer disk drive slot and to facilitate removal of the member from the slot when the computer is to be used. At least the portion of the device which enters into the disk drive slot is made of resilient plastic to resiliently hold the member in place in the disk drive slot.

15 Claims, 1 Drawing Sheet

DISK DRIVE SLOT DUST PROTECTOR

BACKGROUND

Personal computers have become standard tools both in businesses and the home. Large numbers of versatile programs for a variety of different uses have been written for such computers. Personal computers typically include one or more disk drives for use with floppy disks. These disks come in different "standard" sizes and presently comprise magnetized disks containing information, programs, or data files in machine readable form by the read and write heads associated with disk drive units in the computer. The computers incorporate the disk drive units behind a disk drive slot which usually is located in the front of the computer housing.

Typically, the floppy disk drive slots are exposed to the surrounding environment both when the computer is in use and not in use. The entry of dust and other airborne contaminants into the disk drive unit and into the computer through the disk drive slots can lead to malfunctioning or erroneous operation of either the computer or of the disk drive unit located behind such slots. The cooling fan draws such contaminants into the slot if the slot is open. Dust covers have been developed in the form of flexible material covers, made of vinyl or other suitable material, which can be placed over the entire computer unit when it is not in use. Such covers are bulky and cumbersome and are difficult to store when the computer is being used.

A disk drive locking device for preventing operation of the disk drive by unauthorized users is disclosed in the Lakoski U.S. Pat. No. 4,685,312. The device disclosed in the Lakoski Patent is a portable locking device which has a number of different parts, including some rigid metal parts, which are inserted into and engage the edge of the disk drive slot of the computer. Other parts are locked onto the part which is inserted into the slot and include a key-locked clasp which, in the locked position, prevents access to the disk drive of the computer. A large number of interrelated parts are used in this device which, to some extent, covers the slot of the computer when it is in the locked position. The primary intent of this device, however, is not to prevent dust or contaminants from entering the slot of the disk drive unit, but instead, the device is intended to prevent unauthorized operation of the computer by preventing access to the disk drive unit.

It is desirable to provide a simple device for preventing dust or other airborne contaminants from entering the disk drive unit and the computer interior through the disk drive slots.

SUMMARY OF THE INVENTION

It is an object of this invention to provide an improved device for preventing the entry of dust and airborne contaminants into a computer through the disk drive slot.

It is another object of this invention to provide an improved dust protector device for a computer.

It is an additional object of this invention to provide an improved disk drive dust protector for a computer.

It is a further object of this invention to provide a simple, inexpensive, dust protector device for preventing the entry of dust and contaminants into the disk drive slot of a personal computer.

In accordance with a preferred embodiment of this invention, a device is provided to prevent airborne contaminants from entering the disk drive slot in a computer. The device comprises an elongated slot entry member which has a front edge and a rear edge. The width of the slot entry member is substantially equal to the width of the computer disk drive slot, and the height is also substantially equal to the height of the computer disk drive slot. A portion of the member adjacent the front edge is made to permit its insertion a predetermined distance into the computer disk drive slot. A handle is provided on the rear edge of the slot entry member to facilitate its insertion and removal into and from the disk drive slot of the computer.

DETAILED DESCRIPTION

Reference now should be made to the drawings in which the same reference numbers are used throughout the different figures to designate the same components.

Figure 1:
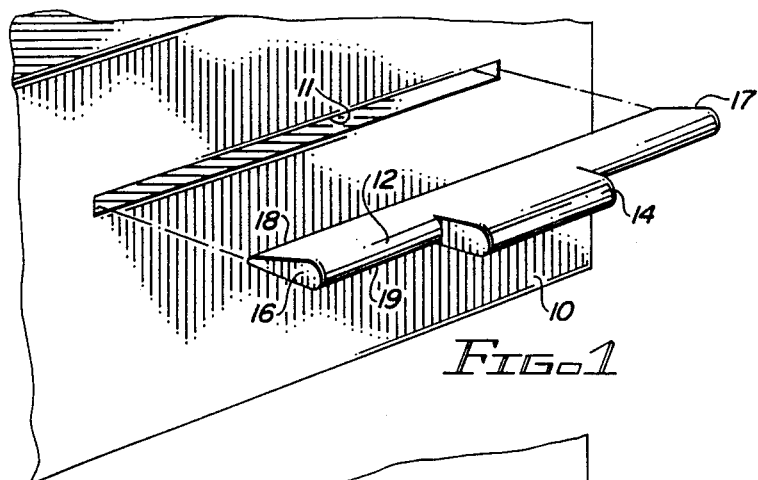
FIG. 1 is a perspective view of a preferred embodiment of the invention, associated with a computer disk drive slot.
Figure 2:
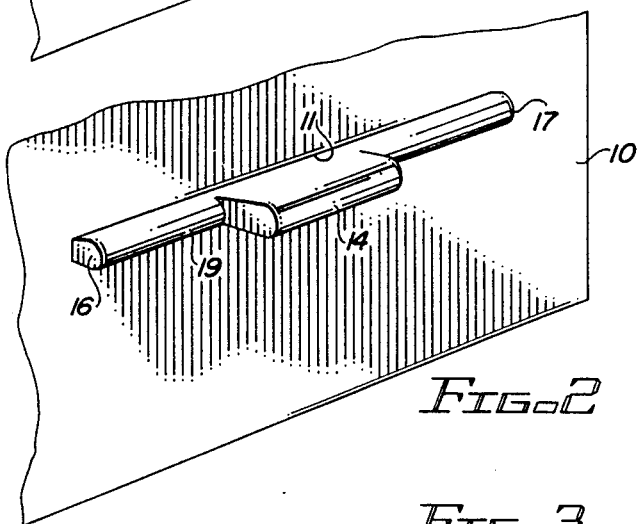
FIG. 2 illustrates the embodiment of FIG. 1 in its position of use in conjunction with a computer.
Figure 3:
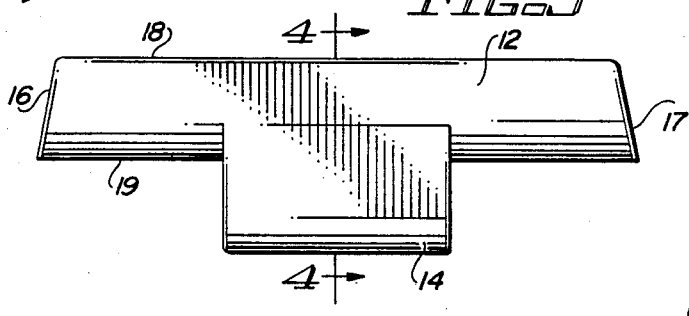
FIG. 3 is a top view of the device shown in FIG. 1.

FIG. 1 shows a preferred embodiment of the invention, aligned and ready for use to close off the disk drive slot 11 of a computer 10 to prevent dust and other airborne contaminants from entering the interior of the computer 10 and the disk drive unit located behind the slot 11. The device comprises an elongated wedge-shaped entry member 12, with a relatively thin front edge 18 which tapers uniformly outwardly toward a substantially thicker rear edge 19. As shown most clearly in FIG. 3, the ends or edges 16 and 17 of the member 12 are narrower at the front edge 18 and taper uniformly outwardly to the rear edge 19 to cause the rear edge 19 to be wider than the front edge 18 of the device 12. A handle 14 is attached to the rear edge 19 of the slot entry member 12. As shown in FIGS. 1 and 2, when it is desired to close off the disk drive slot 11 of the computer 10, the device is moved from the position shown in FIG. 1 to the position shown in FIG. 2.

The dimensions of the slot entry member 12 are selected such that the length or width of the front edge 18 is slightly less than the width of the computer disk drive slot 11. Consequently, entry of the edge 18 into the slot 11 is facilitated. Similarly, the thickness or height of the edge 18 is less than the vertical height of the slot 11, again to facilitate entry of the edge 18 and the forward portion of the slot entry member 12 into the slot 11.

The length or width of the rear edge 19 is greater than the width of the slot 11 and the vertical thickness or height of the rear edge 19 also is greater than the height of the slot 11. Consequently, when the device is moved from the position shown in FIG. 1 to the position shown in FIG. 2, it wedges tightly in the slot 11, both from end-to-end and from top-to-bottom to securely close the slot 11. The distance which the front edge 18 of the device 12 extends into the slot 11 typically is of the order of one-half inch or so. Obviously, for computers 10 having disk drives of different widths, the device 12 is tailored to the overall configuration of the slot 11 which is associated with such a disk drive. The device, however, works with disk drives in computers of various makes to securely close the disk drive slot 11.

The material out of which the device shown in FIGS. 1 through 4 is made is preferably a relatively rigid, yet resilient, rubber-like plastic material, so that some deformation of the device takes place when it is firmly pushed into the slot 11 into the position shown in FIG. 2. A variety of suitable materials are available for this purpose, including rubber and many plastics.

The device shown in FIGS. 1 through 4 may be made as an integral molded plastic part, so that the handle 14 is integrally formed with the wedge-shaped elongated slot entry member 12. Alternatively, the handle 14 may be made of different material from the member 12 and attached to the rear edge 19 of the member 12 in any suitable manner.

Figure 6:
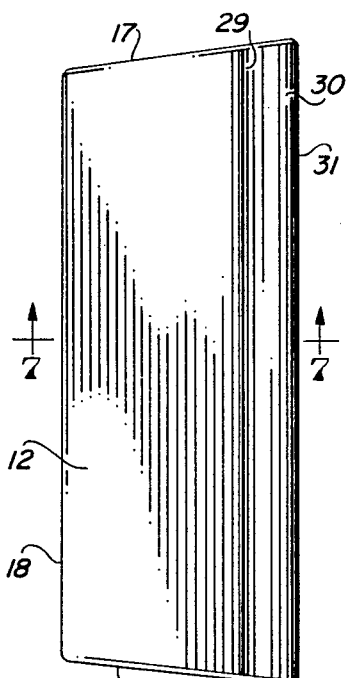
FIG. 6 is a top view of the embodiment of FIG. 5.
Figure 7:
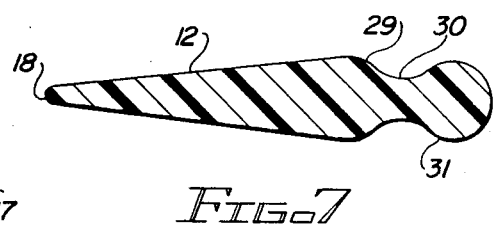
FIG. 7 is a cross-sectional view taken along the lines 7—7 of FIG. 6.
Figure 4:
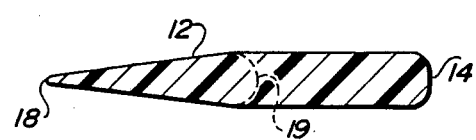
FIG. 4 is a cross-sectional view of the device shown in FIG. 3, taken along the lines 4—4.
Figure 5:
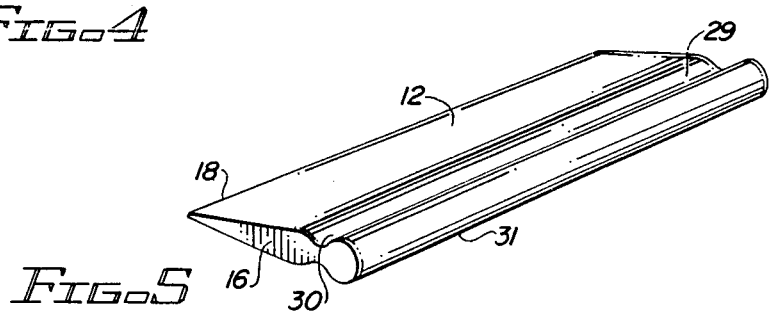
FIG. 5 is a perspective view of an alternate embodiment of the invention.

FIGS. 5 through 7 illustrate an alternative embodiment of the invention which may be made from an elongated plastic extrusion of uniform cross-section. In the device shown in FIGS. 5, 6, and 7, the handle 14 has been replaced with an attached narrowed neck or depression 30 which then flares outwardly into an elongated rod-like grasping bar or handle 31. As shown most clearly in FIGS. 5 and 7, the entire device of FIGS. 5, 6, and 7, may be made from an extruded plastic part of uniform cross-section and cut to the desired length, including the tapered sides 16 and 17, as shown in FIG. 6. This is an economical way of manufacturing the device, and the device of FIGS. 5 through 7 operates functionally in the same manner as the embodiment shown in FIGS. 1 through 4.

Significant cost savings, however, are possible through the utilization of plastic extrusion manufacturing techniques for forming the device of FIGS. 5, 6, and 7. Once again, the device is made of a material which is relatively rigid, yet resilient enough to deform slightly both in the vertical dimension shown in FIG. 7, as well as at the edges 16 and 17 to cause it to firmly wedge into the slot 11. Such deformation of elastic material also causes the device to be held securely in the slot 11 until it is removed by grasping the portion 31 and pulling outwardly or toward the right, as viewed in FIGS. 1, 2 and 5 through 7.

Figure 8:
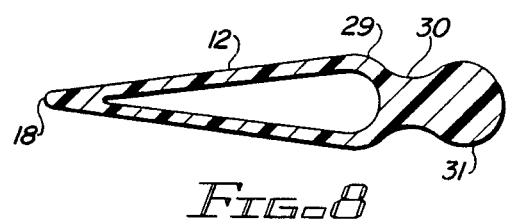
FIG. 8 is a cross-sectional view, similar to the view of FIG. 7, showing another embodiment of the invention.

A savings in material, and also facilitation of the resiliency of the device in the vertical dimension, is provided by manufacturing the extrusion of FIGS. 5, 6, and 7, with a hollow interior, as illustrated in FIG. 8. The same materials which are used for the solid device illustrated in FIG. 7, also may be employed for the version of FIG. 8. If the edges 16 and 17, however, are left open to the hollow interior shown in FIG. 8, a somewhat less effective sealing of the slot 11 at its opposite ends is attained by such a device, since it is possible for some air and dust to enter through the open ends into the hollow interior of the device and then back outwardly into the computer 10. This is a relatively small possibility; but if maximum effective sealing of the slot 11 is desired, the embodiments of FIGS. 1 through 4, or FIGS. 5 through 7 are preferred. The open ends of the device of FIG. 8 can be capped, or it may be filled with foam to block air movement through the ends into the computer.

The device which is described above in conjunction with the preferred embodiments of the invention is extremely simple to manufacture and to use. At the same time, however, it is very effective to close off the disk drive slot 11 of the computer. It is readily apparent that the device also is small in size; so that it is unobtrusive when it is place, as shown in FIG. 2, and also does not create any storage problems when the device is placed aside.

The embodiments, which have been described above and which are shown in the drawing, are to be considered as illustrative of the invention and not as limiting. Various changes and modifications will occur to those skilled in the art without departing from the true scope of the invention, as defined in the appended claims.

I claim:

1. A device for preventing airborne contaminants from entering the disk drive slot in a computer including in combination:

an elongated slot entry member made of resilient material and having a front edge and a rear edge, said member having a width substantially equal to the width of a computer disk drive slot and having a thickness substantially equal to the height of a computer disk drive slot, said elongated slot entry member including a portion adjacent said front edge thereof for insertion a predetermined distance into such a computer disk drive slot, said elongate slot entry member tapering from the front edge thereof to the rear edge thereof, with the front edge thereof having a thickness which is less than the height of said computer disk drive slot and the rear edge thereof having a thickness which is greater than the height of said computer disk drive slot; and handle means on the rear edge of said slot entry member to facilitate insertion and removal of said member into and from such disk drive slot.

2. The combination according to claim 1 wherein the rear edge of said slot entry member is wider than the front edge thereof.

3. The combination according to claim 2 wherein said rear edge of said slot entry member is wider than such computer disk drive slot and the front edge of said member is narrower than such computer disk drive slot.

4. The combination according to claim 3 wherein the tapering of said elongated slot entry member is substantially uniform.

5. The combination according to claim 4 wherein at least said elongated slot entry member is made of plastic material.

6. The combination according to claim 5 wherein said handle means is integrally formed with said slot entry member.

7. The combination according to claim 6 wherein said device is formed from an elongated extrusion of plastic material, with said slot entry member and said handle means being integrally formed.

8. The combination according to claim 7 wherein said handle means is secured to said rear edge of said slot entry member through a neck means for facilitating the grasping of said handle means by the fingers of a user of the device.

9. The combination according to claim 8 wherein said elongated slot entry member is formed from an extrusion of resilient plastic, and wherein said member is hollow.

10. The combination according to claim 1 wherein said device is formed from an elongated extrusion of plastic material, with said slot entry member and said handle means being integrally formed.

11. The combination according to claim 10 wherein all cross-sections of said extruded device in planes perpendicular to the front edge thereof are uniform.

12. The combination according to claim 1 wherein said elongated slot entry member is formed from an extrusion of resilient plastic, and wherein said member is hollow.

13. The combination according to claim 1 wherein said rear edge of said slot entry member is wider than such computer disk drive slot and the front edge of said member is narrower than such computer disk drive slot.

14. The combination according to claim 1 wherein at least said slot entry member is made of plastic material.

15. The combination according to claim 1 wherein said handle means is integrally formed with said slot entry member.

* * * * *